US009274756B1

(12) United States Patent
Clausen et al.

(10) Patent No.: US 9,274,756 B1
(45) Date of Patent: Mar. 1, 2016

(54) SYSTEM TO VISUALIZE ADDITIONAL INFORMATION ON SOURCE CODE

(71) Applicant: GOOGLE INC., Mountain View, CA (US)

(72) Inventors: Lars Ræder Clausen, Munich (DE); Michael Conradt, Munich (DE)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/103,616

(22) Filed: Dec. 11, 2013

(51) Int. Cl.
*G06F 9/44* (2006.01)

(52) U.S. Cl.
CPC ........................................ *G06F 8/30* (2013.01)

(58) Field of Classification Search
CPC ............... G06F 8/30; G06F 8/33; G06F 8/34
USPC .................................................. 717/106–119
See application file for complete search history.

(56) References Cited

U.S. PATENT DOCUMENTS 6,865,713 B1 * 3/2005 Bates et al. .................... 715/233
7,454,744 B2 11/2008 Bhogal et al.
8,418,130 B2 4/2013 Tittizer et al.
2008/0077910 A1 3/2008 Ohta
2012/0131547 A1 * 5/2012 Muir .............................. 717/109
2013/0185700 A1 7/2013 Avrahami et al.

OTHER PUBLICATIONS

Dustin Marx, "Inspired by Actual Events: NetBeans 7 and Software Quality Environment", 2011, retrieved from http://marxsoftware.blogspot.com/2011/08/netbeans-7-and-software-quality.html, 7 pages.*

* cited by examiner

*Primary Examiner* — Ted T Vo
(74) *Attorney, Agent, or Firm* — Birch, Stewart, Kolasch & Birch, LLP

(57) ABSTRACT

A system and method are disclosed which provide visual representations of information related to source code, in the form of annotations, to users who are viewing the source code. In an example system, information related to source code may be provided by multiple sources. This information may be displayed as an annotation related to the information in close proximity to the associated source code. When a user selects the annotation, related additional information may be displayed.

22 Claims, 10 Drawing Sheets

FIG. 2

```
81  }
82  // static.
83  float DefaultDogfoodPriority::ComputeIncludeRankPrio(int64 raw_include_rank) {
84    if (raw_include_rank <= kMinRawIncludeRank) {
85      return 0.0f;
86    }
87    float log_include_rank = log10(raw_include_rank - kMinRawIncludeRank + 1);
88    return fmin(codesearch::kMaxIncludeRankPrio,
89                log_include_rank * codesearch::kScaleFactor);
90  }
91
92  // static
93  float DefaultDogfoodPriority::ComputeLogsPrio(int32 raw_file_views) {
94    if (raw_file_views <= 1) {
95      return 0.0f;
96    }
97    float log_file_views = log10(raw_file_views);
98    return fmin(codesearch::kMaxLogsPrio,
99                log_file_views * codesearch::kScaleFactor);
100 }
```

FIG. 3

```
#include "strings/stringpiece.h"
#include "strings/stringpiece_utils.h"  // for SplitAllowEmpty, ...
include "strings/util.h"                // for StringReplace namespace codesearch { const int kNumFoldLines = 5;

// Returns the length of the indent of the given text.
// TODO(larsrc): Handle tabs (according to language)
int GetIndentLength(const StringPiece& str) {
  // Assumes spaces for now.
  std::string::size_type find = str.find_first_not_of(" \t");
```

FIG. 4

```
static bool Matches(const string& path, const string& base_path,
                    const string* const prefixes, int size) {
    for(int i = 0; i < size; ++i) {
        string path_re = StrCat("^", base_path, *prefixes[i], "($|/)");
        if (RE2::PartialMatch(path, path_re)) {
            return true;
        }
    }
    return false;
} bool IsIncludedInSource(const string& path, const Source& source) {
    // File must be under source path.
    if (!RE2::PartialMatch(path, StrCat("^", source.path(), "($|/)"))) {
        return false;
    }
    return IsIncludedInSource(path, source, StrCat(source.path(), "/"));
} bool IsIncludedInSource(const string& path,
                       const Source& source,
                       const string& base_path) {
    // Check inclusion/exclusion rules
```

Search | History | Warnings | Clones

/project/codepath/index/file.cc       contains this clone 1 times
14 - 33

/project/codepath/index/file.cc       contains this clone 1 times
15 - 34

Show copies of this clone
Show all lines

FIG. 6

```cpp
static bool Matches(const string& path, const string& base_path,
                    const string* prefixes, int size) {
  for(int i = 0; i < size; ++i) {
    string path_re = StrCat("^", base_path, "($|/)", *prefixes[i], "($|/)");
    if (RE2::PartialMatch(path, path_re)) {
      return true;
    }
  }
  return false;
} bool IsIncludedInSource(const string& path, const Source& source) {
  // File must be under source path.
  if (!RE2::PartialMatch(path, StrCat("^", source.path(), "($|/)"))) {
    return false;
  }
  return IsIncludedInSource(path, source, StrCat(source.path(), "/"));
} bool IsIncludedInSource(const string& path,
                        const Source& source,
                        const string& base_path) {
  // Check inclusion/exclusion rules
  bool included = (source.include_size() == 0) ||
```

FIG. 7

SYSTEM TO VISUALIZE ADDITIONAL INFORMATION ON SOURCE CODE

BACKGROUND

Source code for software projects can often be difficult for people to understand if they are reading the source code independently of information that may provide an explanation of the code. When viewing code, additional information related to the code may be relevant for understanding the code's purpose, functionality, or for finding a way to modify the code or fix broken code. For example, when handling a software issue in the codebase, it may be helpful to have information about the issue in addition to the source code. This information may include recent file changes, whether an automated tool detected the code issue, and any data that was collected at runtime of the code including how many central processing unit (CPU) cycles or memory a specific method uses during runtime. Not only can additional information help with code fixes, but this additional information related to the code may also help highlight things about the code that are noteworthy or that should be brought to the attention of a user viewing the code.

Some conventional Integrated Development Environments (IDEs) include information related to code within the development environments. However, this information is limited to certain information that can be derived directly from the code. Furthermore, although this additional information may be available, it is not often readily accessible to software engineers working in a codebase or other users viewing the source code. In conventional systems, users have to explicitly know about the existence of this information, understand how to retrieve the information, and possibly know how to use the information. Information related to the code, but not derived from the code, should be readily accessible to users so that the users have a clear understanding regarding codebases' functionality and purposes.

SUMMARY

This specification describes technologies relating to viewing source code in general, and specifically to methods and systems for visualizing additional information in source code.

In general, one aspect of the subject matter described in this specification can be embodied in a system and method for visualizing additional information about source code. An example system includes one or more processing devices and one or more storage devices storing instructions that, when executed by the one or more processing devices, cause the one or more processing devices to execute an example method. An example method includes: receiving information related to the source code from a plurality of sources; generating at least one code annotation from the received information that is related to a piece of the source code; and displaying the annotation in close proximity to the related piece of the source code.

These and other embodiments can optionally include one or more of the following features: close proximity may be inline with annotation's associated source code; the annotation may be an actionable item; the annotation may be generated based on a category associated with the information that the annotation represents; at least two pieces of information may be generated from the same information category and displayed as an aggregated annotation; at least one annotation layer which represents an information type may be generated; a layer may represent an area of interest; layers may expand to show information types; a status indicator may indicate whether layer information has been completely fetched and loaded; and upon selection of an annotation, information associated with the annotation may be displayed.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 2 is an example annotation.

FIG. 3 is an example annotation of source code.

FIG. 4 is an example of two annotation types within source code.

FIG. 6 is an example annotation for duplicate copies of source code.

FIG. 7 is an example of multiple annotation types within source code.

DETAILED DESCRIPTION

Figure 1:
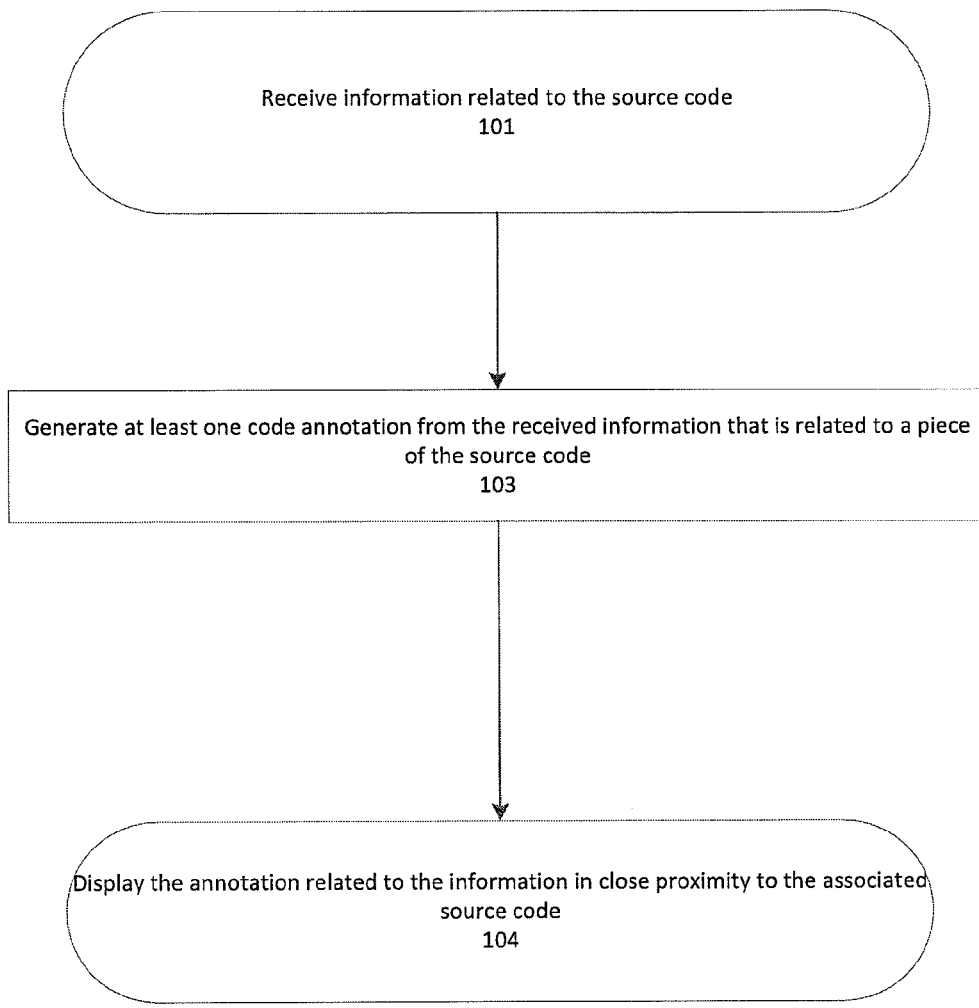
FIG. 1 is a flow diagram of an example method for visualizing additional information in source code.

An example system allows information related to source code to be presented in a manner that is easily discoverable and useable. As illustrated in FIG. 1, an example system may gather information related to the source code from several different sources (101) including static analysis tools, version control systems, build systems, and a production environment. For example, static analysis tools may provide information regarding unused code. Build systems may provide information on test coverage, build warnings, and build errors. A production environment may provide data about code as it executes. For example the environment may be able to provide information about how much of the CPU a method uses or the logs files that may show when and why code crashed or had an error. Regular expression matches may be used to find information including TODOs, potential security issues, and bad coding patterns. In some embodiments, an example system may also gather information from tools that detect duplicate source code.

An example system may receive information related to a codebase (101) as illustrated in FIG. 1. The system may generate an annotation from the received information that is related to a piece of the source code (103), integrate the information so that the information can be displayed in a single user interface, display the annotation related to the received information in close proximity to the associated source code (104). Some annotation types only highlight parts of the source code. Other annotation types may provide highlighting along with additional information or just additional information. In those cases, upon selection of the annotation, the related information may be displayed (105). Information related to software may include information from several different sources including tools designed for specific code analysis, revision history, and production data. An example system may be specifically designed to receive data without regard to the data's source of origin.

Additional information may include: indications regarding tests running on the code; detections of duplicate copies of the same functions or lines of code; warnings about coding style guidelines; build warnings; information regarding things to be done in the code (i.e. TODOs); lists of recent changes to a source code file or directory; or any other information that is useful for understanding or working with the source code. This additional information differs from code comments in that code comments are explicitly put in code by users. Annotations based on additional information may not be in the code, but are related to the code. They may be provided from external sources and may be displayed within the code. These annotations may also be flexibly switched on and off at runtime which is not the case with comments. For example, there may be annotations related to TODOs available to display within source code. However, a user may choose not to display annotations related to TODOs. Therefore, even though the information regarding TODOs is available, the user may not see annotations related to TODOs within the source code.

Additional information may improve the quality of codebases in general and give valuable information to software engineers as they search for bugs within the source code, try to find potential security issues or code that may negatively affect the maintainability of the codebases, or want to understand where code is running in production.

Figure 2:
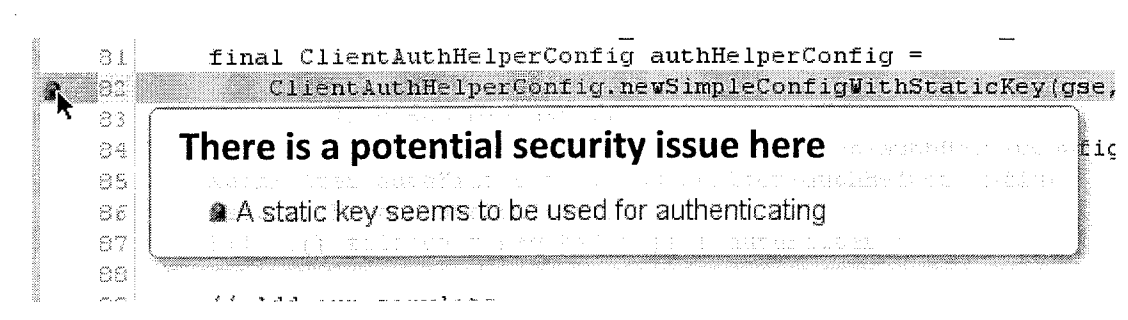

In an example embodiment, additional information about source code may be shown inline with the source code or in close proximity to the source code as illustrated in FIG. 2. This close proximity allows users viewing source code to quickly access the associated additional information in order to facilitate a better understanding of the code. This additional information may be displayed as annotations to the code. Annotations may be generated by an example system based on the information type. A user may select the types of annotations that should be displayed. Annotations such as errors from a build system and severe security warnings may be displayed by default. However, annotations may be displayed or hidden from view based on a user-configurable selection. Additionally, annotations may be stored outside the codebase and may even be generated at runtime. These annotations may be viewable in several integrated development environments and/or code browsers.

Annotations may be displayed as one or more icons or other visual markers, such as colored boxes or symbols, for example. Each information type may have its own annotation and therefore its own visual marker to distinguish among the types of information. FIG. 3 illustrates annotations as highlights in lines of code. In this instance, the colored highlights indicate code coverage. For example, green highlighted lines may indicate code covered by tests while red highlighted lines may indicate code not covered by tests. FIG. 4 illustrates annotations as visual markers (401, 403). Visual marker 401 and visual marker 403 show different annotations that may represent different information types. Multiple types of annotations may be shown on a given line by stacking icons and popping up a list of the annotations on the line when a user hovers over the icon stack. Once a user discovers an annotation within the code, the user may be able to interact with the annotation by hovering over the annotation icon or by clicking the annotation to display more text as illustrated in FIG. 2. Different mechanisms for interaction (e.g. a click vs. a hover) may reveal different information to the user or execute different actions that are appropriate for the respective annotation type with which a user is interacting. Annotation types may correspond to the type of additional information that the annotation represents. As discussed above, additional information may include information about tests, bugs, code style warnings, and build warnings. An additional information type may have a corresponding annotation type.

Figure 5:
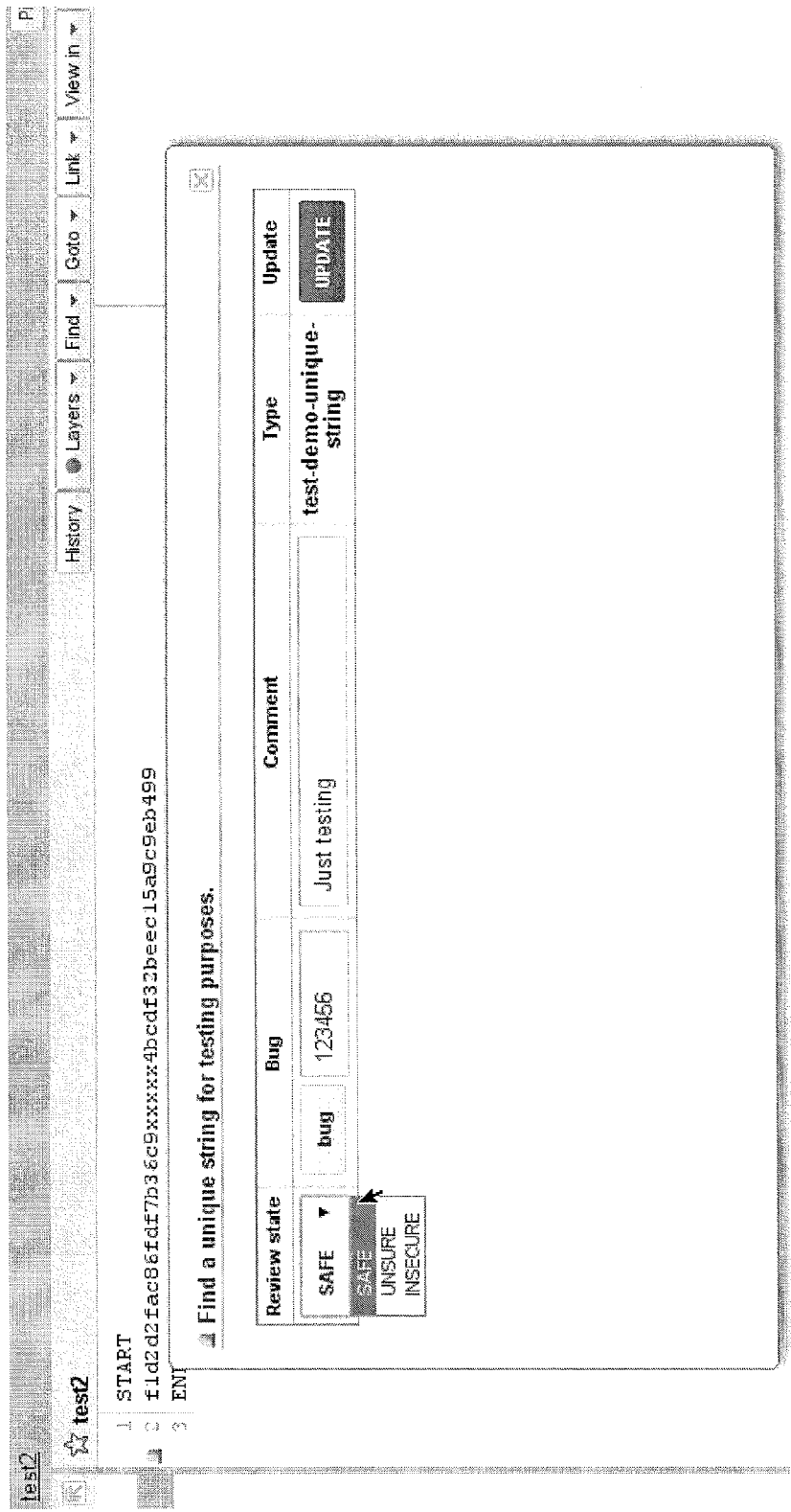
FIG. 5 is an example of an annotation action.

Actions associated with annotations may be informative and interactive as illustrated in FIG. 5. An example of an action may be showing a help page containing detailed and customized instructions regarding how to fix a specific code issue.

In some embodiments, an annotation may be a highlight over a portion of the code to alert a user's attention to the highlighted code. For example, code may be highlighted and include an interactive element, such as an icon shown on the top right side of the source code in FIG. 6. As shown in FIG. 6, initial boxes may for example automatically show highlighted text ranges for all copies of a particular block of code. Each box may be highlighted the same color, such as blue, and have an icon associated with the box. By performing the action of clicking on the icon, a user may be able to view an interactive panel that shows where duplicated code occurs in the source code as shown in FIG. 6 (601). Additionally, when the user interacts with the highlighted box, by hovering over the box or clicking on the box for example, other occurrences of the code in the file may be highlighted a second highlight color. This second highlighting may be done by changing the boxes from an original color to a second color. For example, the initial blue boxes may be highlighted green when the user interacts with an icon associated with a box. This two-step highlighting process may direct a user's attention to specific blocks of code. In the example illustrated in FIG. 6, a first highlighting may show all duplicated code by adding a first highlighted colored box with an icon to one instance of the duplicated code or all instances of the duplicated code. When the user interacts with a highlighted box or icon associated with the box, the highlighted color may change and all instances of the duplicated code may be highlighted with the highlighted color to draw the user's attention to the code segments. In addition to showing duplicated code, highlighted code may also differentiate between code that has been executed as part of unit tests and code that has not executed.

Additionally or alternatively to displaying annotations inline or next to source code, annotations may be displayed by marking some range of code as shown with highlighting in FIG. 6. The marking may include a difference in color, text style, icon, or a box around a range of code among other marking forms. Code annotations may be permanently visible or only visible when a user interacts with the source code, by moving a mouse or hovering for example.

As discussed above, annotations may be of different types. A combination of different annotation types may be displayed simultaneously to a user as shown in FIG. 7. For example, source code may be displayed with warnings regarding code that does not comply with certain stylistic guidelines (701). Additionally, certain aspects of code may be highlighted to indicate highlighting of the same identifier (703). A range of lines may also be annotated indicating that this identifier was detected on multiple lines of code throughout the file (705).

In some embodiments, annotations may be aggregated. Aggregation may entail counting how many instances of each type of information occurs within a file or in files of a directory tree for example. Several different types of aggregations may occur in an example embodiment including: maximums, averages, and/or percentages. Aggregations may be calculated by taking an individual piece of information about the code and outputting the information's associated value to an accumulator for each prefix of a path. For example for a given path "tools/codesearch/frontend," there should be an accumulator for each of the following prefixes: "tools;" "tools/ codesearch;" and "tools/codesearch/frontend." A path may include path-types such as a directory path, a project hierarchy (e.g. "email/UI/Mobile Client"), or an organizational hierarchy (e.g. "Technical Infrastrastructure/Developer Infrastructure/Code Search"). Once through the information, each accumulator calculates the value for that path based on the information values the accumulator received and the kind of aggregation, such as sum or min/max, that should be done.

Figure 8:
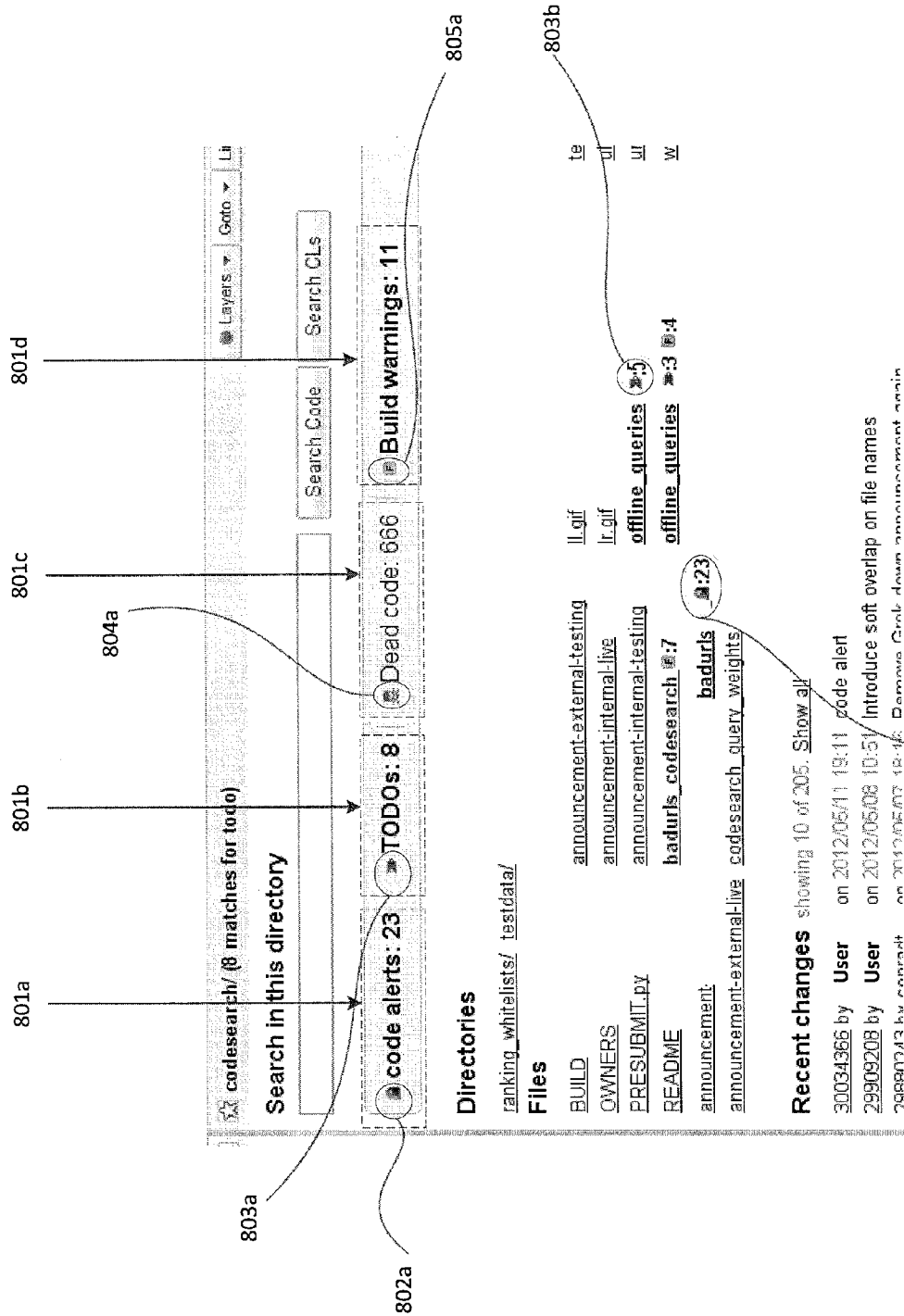
FIG. 8 is an example directory with example annotations.

FIG. 8 shows example aggregation annotations for the contents of the directory named codesearch/. The number of instances for one type of information (TODOs) is shown next to the directory name. Below the search box, aggregated annotations for several other types of information are shown. FIG. 8 shows aggregated annotations for code alerts, TODOs, dead code (unused code), and build warnings. In this example, there are 23 code alerts in the directory, 8 TODOs, 666 instances of unused code, and 11 build warnings. Each aggregated annotation may be represented by a specific icon as shown in FIG. 8.

Aggregated data may be a count of the number of specific annotations that exist in the codebase, a percentage of the codebase covered by annotations, an average of annotation information, or other data that may be derived from the underlying annotation information. An aggregated annotation may be shown in close proximity to a source code file or directory. The annotation may also or alternatively be used to highlight a file or directory or to show the information in a useful way.

Since annotations may be shown for different information types, it may be useful for a user to know how many annotations of each type are present within the source code. A user may be presented with a total number of annotations of a specific information type. By some form of interaction (e.g. by clicking on the total number in an overview panel) the user may also receive more detailed information about these annotations such as specific code alerts, TODOs, or build warnings. Detailed annotations may be added for each of the files or directories contained in a directory. For example, as shown in FIG. 8, totals of information types may be annotated with icons, text, a number (801*a* . . . 801*d*). Icons representing different types of information (802*a*, 803*a*, 804*a*, 805*a*) may provide a legend for particular information found in specific files within a directory. For example, FIG. 8 shows that the file "badurls" contains 23 code alerts (802*b*). The icon associated with the badurl annotation matches the icon associated with code alerts (802*a*). FIG. 8 also shows that "offline_queries" has 5 TODOs (803*b*) because the associated icon matches the icon associated with TODOs. Additional details or actions may be triggered by a user interacting with annotations by hovering over or clicking on the annotations.

Annotations may also enrich a directory view by listing additional information. This additional information may include a list of recent changes made in a given directory or file. By presenting information about source code in close proximity to the code, a user may quickly discover facts about a source code file or directory that otherwise may have been difficult to obtain.

Figure 9:
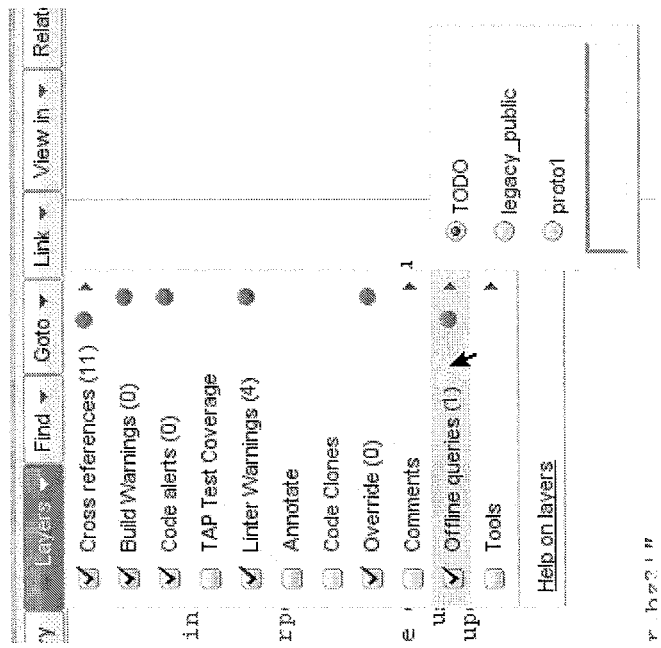
FIG. 9 is an example of layering.

As illustrated in FIG. 9, a layer is an additional type of annotation that an example system may display. Each type of information may be represented by a separate layer. For example, if a user selects the "offline queries" layer, an example system may show the user annotations associated with the information type "offline queries." A drop down menu may offer interaction with layers so that a user may select the information types he or she would like displayed within the source code. For some information types, the number of instances of that type may be shown next to its menu entry. Additionally, there may be a status indicator to indicate whether information has been completely fetched and loaded. For example, a visual indicator may be green indicating that all information has been loaded. The indicator may also be a color such as orange indicating that the information is still loading. There may also be a color states indicating an error fetching the data or a color indicating that data was unavailable. A visual indicator may also indicate if the annotation type is not available for the file type at all or if the annotation type is not yet computed, but basically available. Layers may be grouped by areas of interest. For example, there may be a "security" layer that displays all information types which are security-related. Alternatively or additionally, there may be a layer called "code health" that may consist of information types indicating the health of the code base. A "code health" layer may include information such as style guide violations, build warnings and errors, bad coding patterns, and code complexity.

Figure 10:
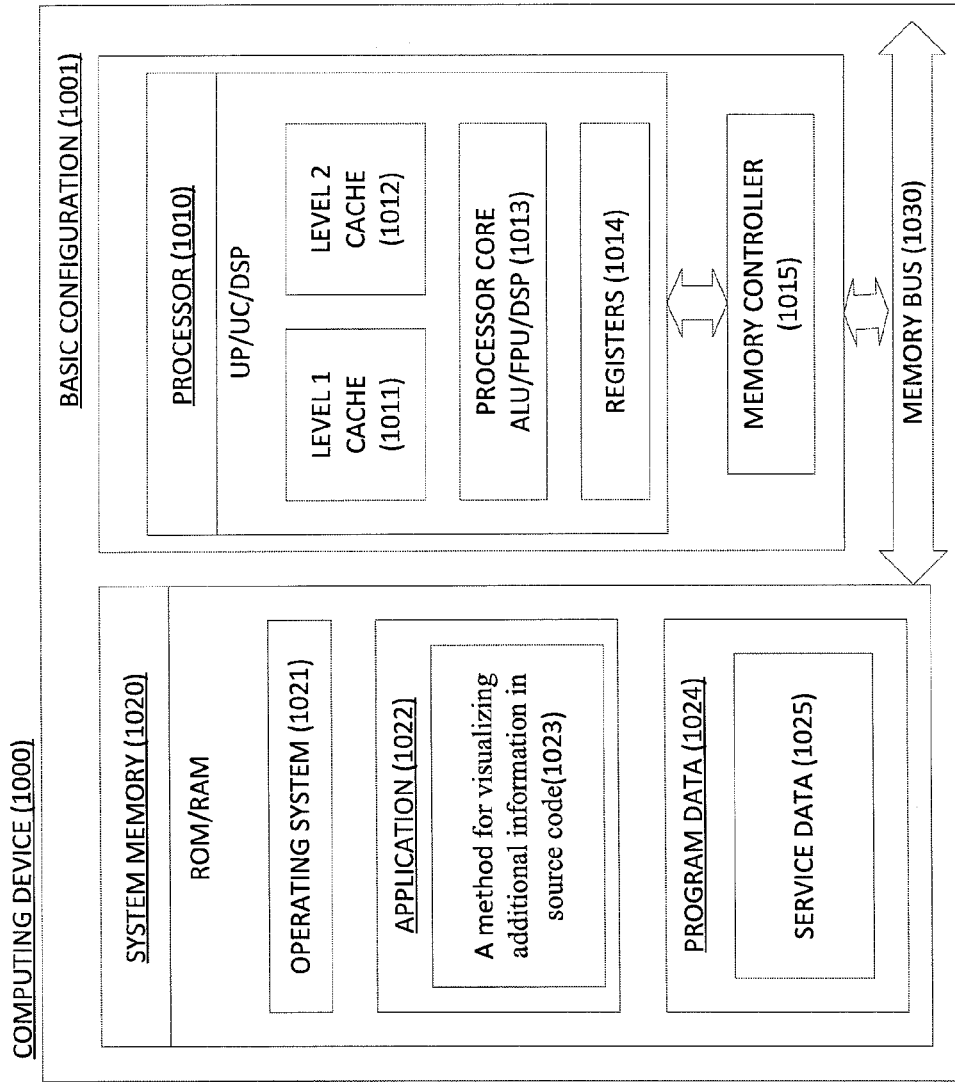
FIG. 10 is a block diagram illustrating an example computing device.

FIG. 10 is a high-level block diagram of an example computer (1000) that is arranged for determining whether an email has an associated annotation and displaying a visual representation of the annotation and enhancement information related to the email so that a recipient can quickly and easily interact with the email. In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a microprocessor (μP), a microcontroller (μC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1016) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more applications (1022), and program data (1024). The application (1022) may include a system for visually representing email. Program Data (1024) includes storing instructions that, when executed by the one or more processing devices, implement a system and method for visually representing annotated email and allowing a user to easily interact with the email. (1023). In some embodiments, the application (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of the device (1000).

The computing device (1000) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for visualizing additional information about source code, the system comprising:
   one or more processing devices and
   one or more storage devices storing instructions that, when executed by the one or more processing devices, cause the one or more processing devices to:
      display source code in an integrated development environment (IDE);
      receive information related to the source code from a plurality of sources external to the IDE, the external sources including at least one of a static analysis tool, a version control system, a build system, and a production environment;
      generate at least one code annotation from the received information that is related to, but not derived from, a piece of the source code; and
      display the annotation in close proximity to the related piece of the source code displayed in the IDE.

2. The system of claim 1 wherein close proximity is inline with the annotation's associated source code.

3. The system of claim 1, wherein the annotation is an actionable item.

4. The system of claim 1, further comprising generating the annotation based on a category associated with the information that the annotation represents.

5. The system of claim 1, further comprising generating at least two pieces of information from the same information category and displaying an aggregated annotation based on the annotations from the same information category.

6. The system of claim 1, further comprising generating at least one annotation layer which represents an information type.

7. The system of claim 6, further comprising a layer that represents an area of interest.

8. The system of claim 7, further comprising allowing the layer representing an area of interest to expand to show the information types associated with the area of interest.

9. The system of claim 6, further comprising a status indicator indicating whether layer information has been completely fetched and loaded.

10. The system of claim 1, further comprising upon selection of the annotation, displaying the information associated with the annotation.

11. The system of claim 1, wherein the annotation includes information about at least one of: indications regarding tests running on the code; build warnings; and lists of recent changes to a source code file or directory.

12. A computer-implemented method for visualizing additional information about source code, the method comprising:
   displaying source code in an integrated development environment (IDE);
   receiving information related to the source code from a plurality of sources external to the IDE, the external sources including at least one of a static analysis tool, a version control system, a build system, and a production environment;
   generating at least one code annotation from the received information that is related to, but not derived from, a piece of the source code; and
   displaying the annotation in close proximity to the related piece of the source code displayed in the IDE.

13. The method of claim 12, wherein close proximity is inline with the annotation's associated source code.

14. The method of claim 12, wherein the annotation is an actionable item.

15. The method of claim 12, further comprising generating the annotation based on a category associated with the information that the annotation represents.

16. The method of claim 12, further comprising generating at least two pieces of information from the same information category and displaying an aggregated annotation based on the annotations from the same information category.

17. The method of claim 12, further comprising generating at least one annotation layer which represents an information type.

18. The method of claim 17, further comprising a layer that represents an area of interest.

19. The method of claim 18, further comprising allowing the layer representing an area of interest to expand to show the information types associated with the area of interest.

20. The method of claim 17, further comprising a status indicator indicating whether layer information has been completely fetched or loaded.

21. The method of claim 12, further comprising upon selection of the annotation, displaying the information associated with the annotation.

22. The method of claim 12, wherein the annotation includes information about at least one of: indications regarding tests running on the code; build warnings; and lists of recent changes to a source code file or directory.

* * * * *